United States Patent
Yin et al.

(10) Patent No.: US 12,423,825 B2
(45) Date of Patent: Sep. 23, 2025

(54) SEMANTIC SEGMENTATION METHOD FOR CROSS-SATELLITE REMOTE SENSING IMAGES BASED ON UNSUPERVISED BIDIRECTIONAL DOMAIN ADAPTATION AND FUSION

(71) Applicant: ZHEJIANG UNIVERSITY, Zhejiang (CN)

(72) Inventors: Jianwei Yin, Hangzhou (CN); Yuxiang Cai, Hangzhou (CN); Yingchun Yang, Hangzhou (CN); Shuiguang Deng, Hangzhou (CN); Ying Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 15 days.

(21) Appl. No.: 17/911,551

(22) PCT Filed: Sep. 17, 2021

(86) PCT No.: PCT/CN2021/119171
§ 371 (c)(1),
(2) Date: Mar. 9, 2023

(87) PCT Pub. No.: WO2023/029111
PCT Pub. Date: Mar. 9, 2023

(65) Prior Publication Data
US 2024/0212162 A1 Jun. 27, 2024

(30) Foreign Application Priority Data
Aug. 30, 2021 (CN) .......................... 202111017498.9

(51) Int. Cl.
G06T 7/12 (2017.01)
G06T 11/60 (2006.01)

(52) U.S. Cl.
CPC .............. *G06T 7/12* (2017.01); *G06T 11/60* (2013.01)

(58) Field of Classification Search
CPC . G06T 11/60; G06T 7/12; G06T 2207/20081; G06T 2207/20084;
(Continued)

(56) References Cited

U.S. PATENT DOCUMENTS

2019/0046068 A1* 2/2019 Ceccaldi .............. G06V 10/764

FOREIGN PATENT DOCUMENTS

| CN | 112508031 | 3/2021 |
|---|---|---|
| CN | 112699892 | 4/2021 |
| CN | 112991353 | 6/2021 |

* cited by examiner

*Primary Examiner* — Manuchehr Rahmjoo
(74) *Attorney, Agent, or Firm* — Jiwen Chen; Joywin IP Law PLLC (57) ABSTRACT

The present invention discloses a semantic segmentation method for cross-satellite remote sensing images based on unsupervised bidirectional domain adaptation and fusion. The method includes training of bidirectional source-target domain image translation models, selection of bidirectional generators in the image translation models, bidirectional translation of source-target domain images, training of source and target domain semantic segmentation models, and generation and fusion of source and target domain segmentation probabilities. According to the present invention, by utilizing source-target and target-source bidirectional domain adaptation, the source and target domain segmentation probabilities are fused, which improves the accuracy and robustness of a semantic segmentation model for the cross-satellite remote sensing images; and further, through the bidirectional semantic consistency loss and the selection of the parameters of the generators, the influence (Continued)

due to the instability problem of the generators in the bidirectional image translation models is avoided.

7 Claims, 2 Drawing Sheets

(58) Field of Classification Search
CPC ......... G06T 7/11; G06T 7/143; G06F 18/214; G06F 18/22; G06F 18/241; G06F 18/254
See application file for complete search history.

SEMANTIC SEGMENTATION METHOD FOR CROSS-SATELLITE REMOTE SENSING IMAGES BASED ON UNSUPERVISED BIDIRECTIONAL DOMAIN ADAPTATION AND FUSION

This is a U.S. national stage application of PCT Application No. PCT/CN2021/119171 under 35 U.S.C. 371, filed Sep. 17, 2021 in Chinese, claiming priority to Chinese Patent Applications No. 202111017498.9, filed Aug. 30, 2021, all of which are hereby incorporated by reference.

FIELD OF TECHNOLOGY

The present invention belongs to the technical field of unsupervised domain adaptation for semantic segmentation of remote sensing images, and particularly relates to a bidirectional unsupervised domain adaptation and fusion based semantic segmentation method for cross-satellite remote sensing images.

BACKGROUND TECHNOLOGY

With the continuous launch of domestic satellites and the improvement of series types, it is possible to collect massive remote sensing satellite image data. For example, high-resolution satellites can capture a large number of high-spatial-resolution images on a global scale, and such massive data provides many application opportunities, but presents many challenges as well, in which semantic segmentation or dense labeling of satellite images has become one of the most interesting and long-standing issues as it is a key technique widely used in the fields of urban monitoring, urban management, agriculture, automatic mapping and navigation.

Over the past few years, a convolutional neural network has become the most common tool in semantic segmentation, and some convolutional neural network (CNN)-based architectures, such as FCN, SegNet, U-Net, PSPNets, and Deeplab, have shown their effectiveness in this task. When training and test data comes from the same data distribution or the same domain, they both perform well. However, when we try to apply a model to images acquired from different satellites and perform semantic segmentation, the model performance drops sharply due to different data distributions (domain shift) of different satellite images, thus causing unsatisfactory results. In some literatures, this issue is referred to as domain adaptation. In the field of remote sensing, domain shift is usually caused by different atmospheric conditions, differences in acquisition (which will change spectral characteristics of objects), variability in inner classes, differences in spectral characteristics of sensors, or different types of spectral bands (for example, some images may be in red, green and blue bands, while others may be in near-infrared, red and green bands).

In a typical domain adaptation issue, a training image and a test image are usually designated as a source domain and a target domain. A common solution to deal with domain adaptation is to create a new semantically labeled data set on the target domain and train a model thereon. Since it would be time-consuming and expensive to collect a large number of pixel-labeled images for a target city, this solution is very expensive and impractical. In order to reduce the workload of manual pixel-based classification, there are already certain solutions, such as synthesis of data from 3D rendered images or weakly supervised labels. However, these methods still have limitations as they also require a lot of manual labor. In order to improve the generalization ability of a convolutional neural network, another common method involves randomly changing colors for data augmentation, such as gamma correction and image brightness translation, and is widely used in remote sensing. Nonetheless, in a case where data distributions are significantly different, these augmentation methods are very limited when it comes to adjusting a model from one domain to another domain. For example, it is impossible to apply a model of one domain containing red, green, and blue bands to another domain containing near-infrared, red, and green channels by using such simple data augmentation methods. In order to overcome this limitation, the generative adversarial network (GAN) is used to generate pseudo-target domain images with similar data distribution to the target-domain images, and these generated pseudo-target domain images can be used to train classifiers on target domains. Whereas, due to the instability problem of the generative adversarial network, a model is prone to mode collapse. Even if the number of training epochs of generative adversarial network is larger, the model effect is not necessarily better. Meanwhile, semantic information of the images generated by the generative adversarial network may be changed during the image translation. As a result, transformed images and labels cannot correspond to each other, while both the quality of the generated images and the degree of their correspondence with the labels will affect the effect of a finely adjusted target domain semantic segmentation model. An ideal generator should not only generate high-quality images, but ensure that original semantic information of the images cannot be changed during the translation. Therefore, how to choose an image generator with good effect and how to maintain the semantic consistency of the images before and after translation are important issues faced by cross-domain semantic segmentation of remote sensing images. According to two classifiers trained on the target domain and the source domain, two segmentation results can be obtained. In an experiment, it is found that the two segmentation results are complementary instead of alternative. How to further improve the segmentation effect by fusing the segmentation results of the source domain and the target domain is also an important issue.

SUMMARY OF THE INVENTION

In view of the above, the present invention provides a semantic segmentation method for cross-satellite remote sensing images based on unsupervised bidirectional domain adaptation and fusion. The semantic segmentation model trained on an image of a satellite can be transferred to other high-resolution satellite images, thereby improving the performance and robustness of the semantic segmentation model for the cross-satellite remote sensing image.

A semantic segmentation method for cross-satellite remote sensing images based on unsupervised bidirectional domain adaptation and fusion includes the following steps:

(1) training, by using a source domain image $x_s$ and a source domain label $y_s$, a source domain semantic segmentation model $F_S$;

(2) training, by using the source domain image $x_s$ and a target domain image $x_t$, bidirectional source-target domain image generators including a source-to-target image generator and a target-to-source image generator;

(3) selecting a pair of well-trained image generators from all intermediate image generators saved in the above training process as the source-to-target image generator $G_{S \to T}$ and the target-to-source image generator $G_{T \to S}$;

(4) transforming, by using the image generator $G_{S \to T}$, the source domain image $x_s$ from a source domain to a target domain, so as to obtain a pseudo-target domain image $G_{S \to T}(x_s)$;

(5) training, by using the pseudo-target domain image $G_{S \to T}(x_s)$ and the source domain label $y_s$, a pseudo-target domain semantic segmentation model $F_T$;

(6) transforming, by using the image generator $G_{T \to S}$, the target domain image $x_t$ from the target domain to the source domain, so as to obtain a pseudo-source domain image $G_{T \to S}(x_t)$;

(7) inputting the pseudo-source domain image $G_{T \to S}(x_t)$ to the source domain semantic segmentation model $F_S$, so as to obtain a source domain segmentation probability $P_S$ of the target domain image $x_t$;

(8) inputting the target domain image $x_t$ to the pseudo-target domain semantic segmentation model $F_T$, so as to obtain a target domain segmentation probability $P_T$ of the target domain image $x_t$; and (9) fusing the source domain segmentation probability $P_S$ and the target domain segmentation probability $P_T$ to obtain a final segmentation probability $P$ and a segmentation result map of the target domain image $x_t$.

Further, in the step (2), a semantic consistency loss function $\mathcal{L}$ is used in the process of training the bidirectional source-target domain image generators, and has an expression as follows:

$$\mathcal{L} = \mathbb{E}\{\partial(F_S(x_S) \| F_T(G_{S \to T}(x_s)))\} + \mathbb{E}\{\partial(F_T(x_t) \| F_S(G_{T \to S}(x_t)))\}$$

wherein $\mathbb{E}\{\ \}$ denotes a mathematical expectation function, $F_S(x_s)$ is an output result obtained by inputting $x_s$ to the model $F_S$, $F_T(G_{S \to T}(x_s))$ is an output result obtained by inputting $G_{S \to T}(x_s)$ to the model $F_T$, $F_T(x_t)$ is an output result obtained by inputting $x_t$ to the model $F_T$, $F_S(G_{T \to S}(x_t))$ is an output result obtained by inputting $G_{T \to S}(x_t)$ to the model $F_S$, $\partial(F_S(x_s)\|F_T(G_{S \to T}(x_s)))$ is the similarity between $F_S(x_s)$ and $F_T(G_{S \to T}(x_s))$, and $\partial(F_T(x_t)\|F_S(G_{T \to S})(x_t)))$ is the similarity between $F_T(x_t)$ and $F_S(G_{T \to S}(x_t))$.

Further, a specific implementation mode of the step (3) is as follows:

3.1: first, setting the total number of epochs in the training process to be M, saving current model parameters once every $N_i$ epochs, and correspondingly obtaining $$\frac{M}{N_i}$$

image generators $G_{S \to T}{}^i$, wherein $G_{S \to T}{}^i$ denotes the source-to-target image generator saved in the i-th epoch; and similarly, saving the current model parameters once every $N_j$ epochs, and correspondingly obtaining $$\frac{M}{N_j}$$

image generators $G_{T \to S}{}^j$, wherein $G_{T \to S}{}^j$ denotes the target-to-source image generator saved in the j-th iteration, both i and j are natural numbers with $$i \in \left[1, \frac{M}{N_i}\right] \text{ and } j \in \left[1, \frac{M}{N_j}\right],$$

and $N_i$ and $N_j$ are self-set positive integers;

3.2: respectively inputting the source domain image $x_s$ to the image generators $G_{S \to T}{}^i$ and $G_{T \to S}{}^j$, so as to obtain corresponding output results $G_{S \to T}{}^i(x_s)$ and $G_{S \to T}{}^j(x_s)$, wherein $G_{T \to S}$ is the target-to-source image generator, which can generate an image of pseudo-source domain distribution, the target-to-source image converter is usually configured to transform the target domain image $x_t$ into the pseudo-source domain image $G_{T \to S}(x_t)$, and the target-to-source image converter here is used to transform the source domain image $x_s$ into the pseudo-source domain image $G_{T \to S}(x_s)$; under the action of a identity loss function (see specific embodiments for details), the better the training of $G_{T \to S}$ is, the smaller the difference between the pseudo-source domain image $G_{T \to S}(x_s)$ and $x_s$ is, and the less the semantic change is; and the same is true for $G_{S \to T}(x_t)$;

3.3: inputting $G_{S \to T}{}^i(x_s)$ and $G_{T \to S}{}^j(x_s)$ to the model $F_S$ so as to obtain corresponding output results $F_S(G_{S \to T}{}^i(x_s))$ and $F_S(G_{T \to S}{}^j(x_s))$;

3.4: calculating scores iteration-score(i) and iteration-score(j) corresponding to the image generators $G_{S \to T}{}^i$ and $G_{T \to S}{}^j$ according to $F_S(G_{T \to S}{}^j(x_s))$ and $F_S(G_{T \to S}{}^j(x_s))$; and 3.5: taking a set of image generators $G_{S \to T}{}^i$ with the highest corresponding scores iteration-score(i) as $G_{S \to T}$, and taking a set of image generators $G_{T \to S}{}^j$ with the highest corresponding scores iteration-score(j) as $G_{T \to S}$.

Further, in the step 3.4, the scores iteration-score(i) and iteration-score(j) corresponding to the image generators $G_{S \to T}{}^i$ and $G_{T \to S}{}^j$ are calculated by the following formulas:

$$\text{iteration} - \text{score}(i) = \frac{F_S\left(G_{S \to T}^i(x_s)\right) \cap y_S}{F_S\left(G_{S \to T}^i(x_s)\right) \cup y_S}$$

$$\text{iteration} - \text{score}(j) = \frac{F_S\left(G_{S \to T}^j(x_s)\right) \cap y_S}{F_S\left(G_{S \to T}^j(x_s)\right) \cup y_S}$$

wherein $y_s$ is the source domain label.

In the step (9), the source domain segmentation probability $P_S$ and the target domain segmentation probability $P_T$ are fused to obtain the final segmentation probability $P$ and the segmentation result map of the target domain image $x_t$ by the following formulas:

$$P = \frac{\lambda_T}{\lambda_S + \lambda_T} \times P_S + \frac{\lambda_S}{\lambda_S + \lambda_T} \times P_T$$

$$\text{map} = \sigma(P)$$

wherein $\lambda_S$ and $\lambda_T$ are respectively weights of the source domain segmentation probability and the target domain segmentation probability, and $\sigma(\ )$ is a mapping function from the segmentation probability to the segmentation result.

Further, calculation expressions of the weights $\lambda_S$ and $\lambda_T$ are as follows:

$$\lambda_S = \frac{F_S(G_{T \to S}(x_s)) \cap y_S}{F_S(G_{T \to S}(x_s)) \cup y_S}$$

-continued $$\lambda_T = \frac{F_T(G_{S \to T}(x_s)) \cap y_S}{F_T(G_{S \to T}(x_s)) \cup y_S}$$

wherein $G_{T \to S}(x_s)$ is a pseudo-source domain image obtained by inputting $x_s$ to the image generator $G_{T \to S}$ for translation, $F_S(G_{T \to S}(x_s))$ is an output result obtained by inputting $G_{T \to S}(x_s)$ to the model $F_S$, and $F_T(G_{S \to T}(x_s))$ is an output result obtained by inputting $G_{S \to T}(x_s)$ to the model $F_T$.

The method provided by the present invention is a complete semantic segmentation framework for the cross-satellite remote sensing images, and includes training of the bidirectional source-target domain image generators, selection of the bidirectional image generators, bidirectional translation of the source-target domain images, training of the source-target domain semantic segmentation models, and generation and fusion of the source-target domain segmentation probabilities.

The present invention provides an image bidirectional translation network between a source domain image and a target domain image. When the bidirectional image generators are trained, common cycle consistency loss function, adversarial loss function and identity loss function are used in the present invention. In addition, in order to keep the semantics unchanged before and after the bidirectional image translation, the present invention further provides a semantic consistency loss function for image generators. After the training of the bidirectional image generators, the image generators which can generate high-score images in different numbers of iterations during the training are selected by an image generator selection strategy used in the present invention. It is observed that synthetic images output by the numbers of iterations with high scores have higher quality, thus avoiding the use of low-quality synthetic images. Based on the bidirectional image generators, the present invention realizes the bidirectional translation between the source domain and the target domain. After obtained, two results of the target domain and the source domain are fused by a fusion strategy used in the present invention to obtain a final semantic segmentation result, which improves the accuracy of cross-domain semantic segmentation of remote sensing images and the robustness of the method.

DETAILED DESCRIPTION OF THE EMBODIMENTS

In order to describe the present invention more specifically, the technical solutions of the present invention are described in detail below with reference to the accompanying drawings and specific embodiments.

Figure 1:
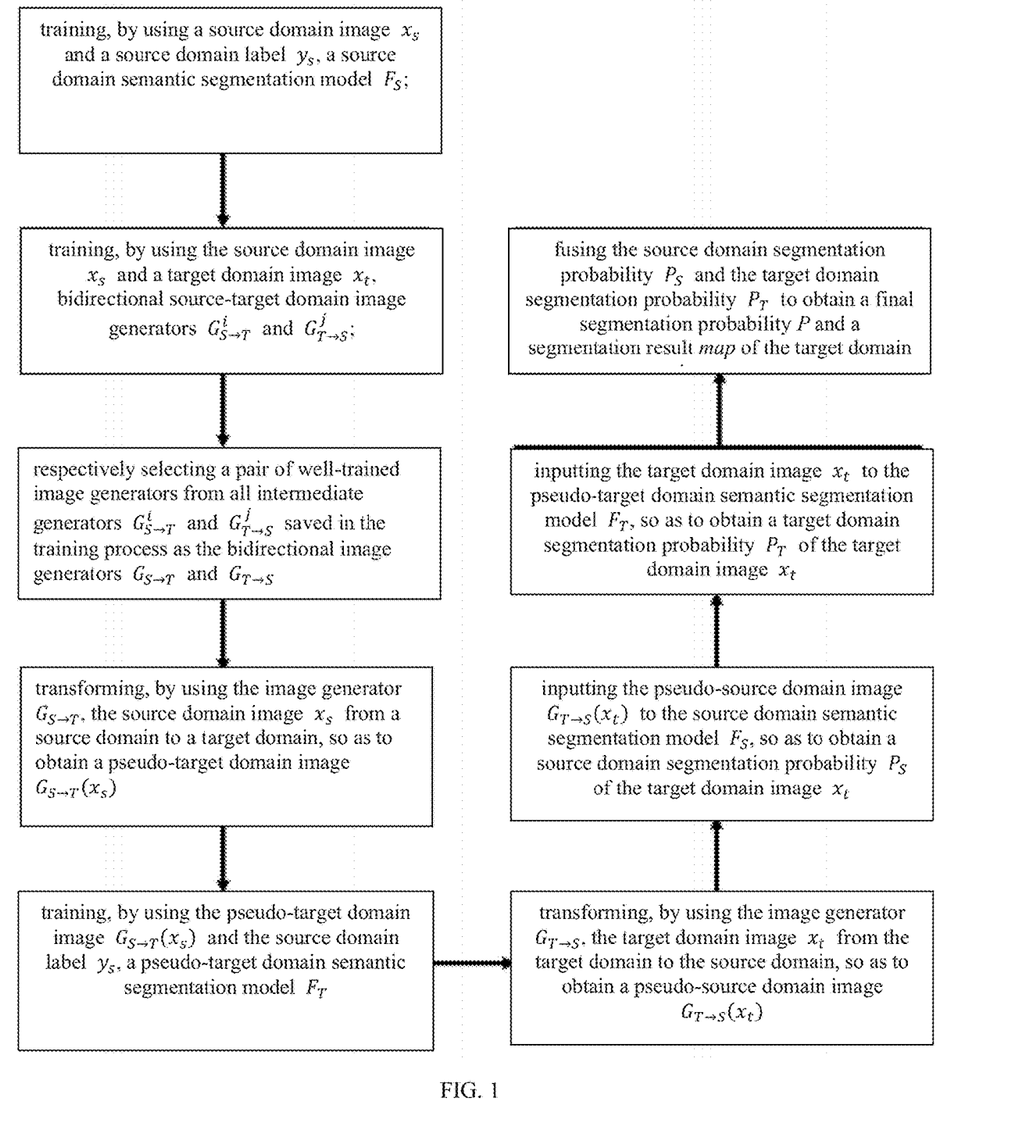
FIG. 1 is a schematic flowchart of steps of a semantic segmentation method for cross-satellite remote sensing images according to the present invention.
Figure 2:
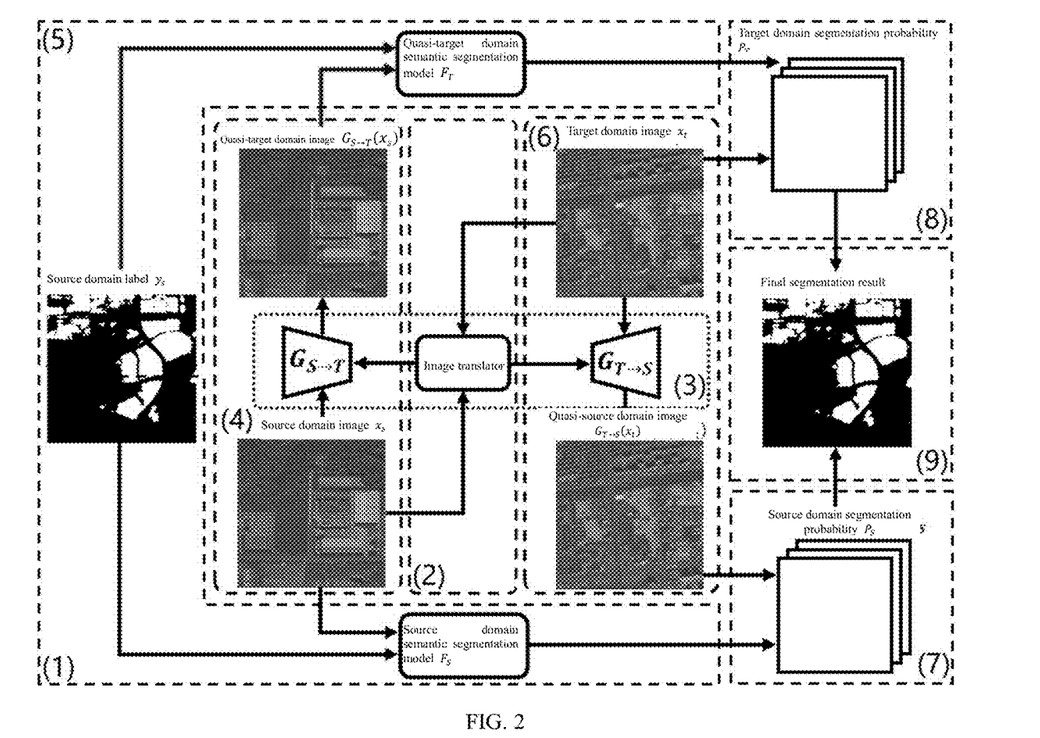
FIG. 2 is a schematic diagram of a specific implementation process of the semantic segmentation method for the cross-satellite remote sensing images according to the present invention.

As shown in FIG. 1 and FIG. 2, a semantic segmentation method for cross-satellite remote sensing images based on unsupervised bidirectional domain adaptation and fusion includes the following steps:

(1) A source domain semantic segmentation model $F_S$ is trained by using a source domain image $x_s$ and a source domain label $y_s$.

Common deeplab, U-net, etc. can be used as a network structure of the model, and a cross entropy loss with K classes is used as a loss function with a corresponding formula as follows:

$$\mathcal{L}_{task}(F_s, x_s, y_s) = -\mathbb{E} \sum_{k=1}^{K} \mathbb{I}_{[k=y_s]} \log\left(softmax\left(F_S^{(k)}(x_s)\right)\right)$$

wherein $x_s$ is the source domain image, $y_s$ is the source domain image label, K is the number of label classes, $F_S$ is the source domain semantic segmentation model, $\mathbb{I}_{[k=y_s]}$ is an indicator function (when $k=y_s$, $\mathbb{I}_{[k=y_s]}=1$; and when $k \neq y_s$, $\mathbb{I}_{[k=y_s]}=0$, wherein the indicator function refers to Zhou Zhihua. Machine Learning [M]. Beijing: Tsinghua University Press, 2016. Main Symbol Table), $\mathbb{E}$ denotes a mathematical expectation function, and $F_S^{(k)}(x_s)$ is a result of a k-th class in output results obtained by inputting $x_s$ to the model $F_S$.

In this embodiment, 2039 4-channel GF1 satellite images with 2039 corresponding building labels are used as source domains and are cut according to a size of 500*500 pixels, deeplabV3+ can be used as the network structure of the model, a learning rate is $10^{-4}$, an optimization algorithm is adam, and a GF1 domain semantic segmentation model $F_S$ is obtained by training 900 epochs.

(2) Bidirectional source-target domain image translation models are trained based on the source domain image $x_s$ and a target domain image $x_t$.

Common methods include traditional methods (such as histogram matching) and deep learning methods (such as generative adversarial networks). This example makes a description with generative adversarial network-based methods, but is not limited to the generative adversarial network-based methods. The bidirectional image translation models include an image generator $G_{S \to T}$ from the source domain image $x_s$ to the target domain image $x_t$, an image generator $G_{T \to S}$ from the target domain image $x_t$ to the source domain image $x_s$, a source domain discriminator $D_S$ and a target domain discriminator $D_T$. Training loss functions include a cycle consistency loss function, a semantic consistency loss function, a identity loss function and an adversarial loss function. Training is stopped after training of M epochs, and image translation models (a source-target image generator GST and a target-source image generator $G_{T \to S}^j$) are saved every N epochs ($N_i=N_j=N$ herein), wherein M and N are natural numbers greater than 0 and M>=N.

An equation of the cycle consistency loss function is as follows:

$$\mathcal{L}_{cyc}(G_{S \to T}, G_{T \to S}, x_s, x_t) =$$

$$\mathbb{E}[\|G_{T \to S}(G_{S \to T}(x_s)) - x_s\|_1] + \mathbb{E}[\|G_{S \to T}(G_{T \to S}(x_t)) - x_t\|_1]$$

wherein $x_s$ is the source domain image, $x_t$ is the target domain image, $G_{S \to T}$ is the image generator from the source domain image $x_s$ to the target domain image $x_t$, $G_{T \to S}$ is the image generator from the target domain image $x_t$ to the source domain image $x_s$, $\mathbb{E}$ is the mathematical expectation function, and $\|\ \|_1$ is an L1 norm.

An equation of the semantic consistency loss function is as follows:

$$\mathcal{L}_{sem}(G_{S \to T}, G_{T \to S}, F_S, F_T, x_S, x_t) =$$

$$\mathbb{E}\{KL(F_S(x_s) \| F_T(G_{S \to T}(x_s)))\} + \mathbb{E}\{KL(F_T(x_t) \| F_S(G_{T \to S}(x_t)))\}$$

wherein $x_s$ is the source domain image, $x_t$ is the target domain image, $G_{S \to T}$ is the image generator from the source domain image $x_s$ to the target domain image $x_t$, $G_{T \to S}$ is the image generator from the target domain image $x_t$ to the source domain image $x_s$, $\mathbb{E}$ is the mathematical expectation function, $F_T$ is a target domain semantic segmentation model, $F_S$ is a source domain semantic segmentation model, and $KL(\|)$ is the KL divergence between two distributions.

An equation of the adversarial loss function is as follows:

$$\mathcal{L}_{adv}(G_{S \to T}, G_{T \to S}, D_S, D_T, x_s, x_t) = \mathbb{E}[\log D_T(x_t)] +$$

$$\mathbb{E}[\log(1 - D_T(G_{S \to T}(x_s)))] + \mathbb{E}[\log D_S(x_s)] + \mathbb{E}[\log(1 - D_s(G_{T \to S}(x_t)))]$$

wherein $x_s$ is the source domain image, $x_t$ is the target domain image, $G_{S \to T}$ is the image generator from the source domain image $x_s$ to the target domain image $x_t$, $G_{T \to S}$ is the image generator from the target domain image $x_t$ to the source domain image $x_s$, $\mathbb{E}$ is the mathematical expectation function, $D_S$ is the source domain discriminator, and $D_T$ is the target domain discriminator.

An equation of the identity loss function is as follows:

$$L_{iat}(G_{S \to T}, G_{T \to S}, x_s, x_t) = \mathbb{E}[\| G_{T \to S}(x_s) - x_s \|_1] + \mathbb{E}[\| G_{S \to T}(x_t) - x_t \|_1]$$

wherein $x_s$ is the source domain image, $x_t$ is the target domain image, $G_{S \to T}$ is the image generator from the source domain image $x_s$ to the target domain image $x_t$, $G_{T \to S}$ is the image generator from the target domain image $x_t$ to the source domain image $x_s$, $\mathbb{E}$ is the mathematical expectation function, and $\|\cdot\|_1$ is the L1 norm.

In this embodiment, 934 GF1 satellite images and 897 GF1B satellite images are respectively used as source domains and target domains, each have a size of 500*500 pixels and 4 channels, and each contain buildings. The image translation models using a generative adversarial network include an image generator $G_{S \to T}$ from a GF1 image $x_s$ to a GF1B image $x_t$, an image generator $G_{T \to S}$ from the GF1B image $x_t$ to the GF1 image $x_s$, a GF1 domain discriminator $D_S$ and a GF1B domain discriminator $D_T$. A network structure of a generator is a 9-layer ResNet, and a network structure of the discriminator is a 4-layer generative adversarial network. The training loss functions include the cycle consistency loss function, the semantic consistency loss function, the adversarial loss function and the identity loss function. The learning rate is $10^{-4}$, and the optimization algorithm is adam. Training is stopped after training of 100 epochs, the image translation models are saved every 10 epochs, and 10 GF1-GF1B image generators $G_{S \to T}^i$ and 10 GF1B-GF1 image generators $G_{T \to S}^j$ are obtained after training.

(3) A pair of well-trained bidirectional source-target domain image translation models are selected.

The source domain image $x_s$ is respectively input to M/N pairs of the generators $G_{S \to T}^i$ and $G_{T \to S}^j$ saved in the step (2) so as to obtain $G_{S \to T}(x_s)$ and $G_{T \to S}^i(x_s)$, wherein i and j belong to [1, M/N]. All $G_{S \to T}^i(x_s)$ and $G_{T \to S}^j(x_s)$ are input to the semantic segmentation model $F_S$. Then scores iteration-score(i) and iteration-score(j) of the generators $G_{S \to T}^i(x_s)$ and $G_{T \to S}^j(x_s)$ in all directions are calculated. A parameter i with the highest score iteration-score(i) in all i is selected as the source-target generator $G_{S \to T}$ in an image translation network, and a parameter j with the highest score iteration-score(j) in all j is selected as the target-source generator $G_{T \to S}$ in the image translation network.

Calculation formulas of the scores iteration-score(i) and iteration-score(j) are as follows:

$$\text{iteration-score}(i) = \frac{F_S(G_{S \to T}^i(x_s)) \cap Y_S}{F_S(G_{S \to T}^i(x_s)) \cup Y_S}$$

$$\text{iteration-score}(j) = \frac{F_S(G_{S \to T}^j(x_s)) \cap Y_S}{F_S(G_{S \to T}^j(x_s)) \cup Y_S}$$

wherein $G_{S \to T}^i$ is the image generator from the source domain image $x_s$ to the target domain image $x_t$, $G_{T \to S}^j$ is the image generator from the target domain image $x_t$ to the source domain image $x_s$, i and j denote i-th and j-th epochs, and i and j belong to [1, M/N].

In this embodiment, 2039 4-channel GF1 satellite images (source domain images $x_s$) with a size of 500*500 pixels are respectively input to 10 pairs of the generators $G_{S \to T}^i$ and $G_{T \to S}^j$ saved in the step (2) so as to obtain $G_{S \to T}(x_s)$ and $G_{T \to S}^i(x_s)$, wherein i belongs to [1, 10]. All $G_{S \to T}^i(x_s)$ and $G_{T \to S}^i(x_s)$ are input to the semantic segmentation model $F_S$. Then scores iteration-score(i) and iteration-score(j) of the generators $G_{S \to T}^i(x_s)$ and $G_{T \to S}^j(x_s)$ in all directions are calculated according to the above formulas. A parameter iteration(i,j)=60 with the highest score iteration-score(j) in all i is selected as a GF1-GF1B generator $G_{S \to T}$ in the image translation network, and a parameter iteration(i,j)=80 with the highest score iteration-score(j) in all j is selected as a GF1B-GF1 generator $G_{T \to S}$ in the image translation network. The iteration-score(i) and the iteration-score(j) are as shown in Table 1:

TABLE 1

| iteration(i, j) | iteration-score(i) | iteration-score(j) |
| --- | --- | --- |
| 10 | 0.0039 | 0.6597 |
| 20 | 0.0523 | 0.7928 |
| 30 | 0.2011 | 0.8 |
| 40 | 0.1795 | 0.805 |
| 50 | 0.1805 | 0.8401 |
| 60 | 0.2067 | 0.8366 |
| 70 | 0.1805 | 0.8358 |
| 80 | 0.188 | 0.8473 |
| 90 | 0.1918 | 0.8398 |
| 100 | 0.1917 | 0.8429 |

(4) The image $x_s$ is transformed from a source domain to a target domain according to the model translation parameter i and the generator $G_{S \to T}$, so as to obtain a pseudo-target domain image $G_{S \to T}(x_s)$.

In this embodiment, 2039 4-channel GF1 satellite images with a size of 500*500 pixels are transformed from a GF1 domain to a GF1B domain according to the model translation parameter iteration(i,j)=60 and the generator $G_{S \to T}$ to obtain pseudo-GF1B images $G_{S \to T}(x_s)$.

(5) A pseudo-target domain semantic segmentation model $F_T$ is trained by using the pseudo-target domain image $G_{S \to T}(x_s)$ and the source domain label $y_s$.

Common deeplab, U-net, etc. can be used as a network structure of the model, and a cross entropy loss with K classes is used as a loss function with a corresponding formula as follows:

$$\mathcal{L}_{task}(F_T, G_{S \to T}(x_s), y_s) = -\mathbb{E}\sum_{k=1}^{K} \mathbb{1}_{[k=y_s]} \log\left(softmax\left(F_T^{(k)}(G_{S \to T}(x_s))\right)\right)$$

wherein $x_s$ is the source domain image, $y_s$ is the source domain image label, K is the number of label classes, $F_T$ is the target domain semantic segmentation model, $\mathbb{1}_{[k=y_s]}$ is the indicator function (when $k=y_s$, $\mathbb{1}_{[k=y_s]}=1$; and when $k \neq y_s$, $\mathbb{1}_{[k=y_s]}=0$), $\mathbb{E}$ denotes the mathematical expectation function, $G_{S \to T}(x_s)$ is the pseudo-target domain image, and $F_T^{(k)}(G_{S \to T}(x_s))$ is a result of a k-th class in output results obtained by inputting $G_{S \to T}(x_s)$ to the model $F_T$.

In this embodiment, 2039 4-channel pseudo-GF1B domain images $G_{S \to T}(x_s)$ with a size of 500*500 pixels and source domain labels $y_s$ generated in the step (4) are used to train a GF1B domain semantic segmentation model $F_T$; and deeplabV3+ is used as the network structure of the model, the learning rate is $10^{-4}$, the optimization algorithm is adam, and a pseudo-GF1B domain semantic segmentation model $F_T$ is obtained by training 100 epochs.

(6) The image $x_t$ is transformed from the target domain to the source domain according to the model translation parameter j and the generator $G_{T \to S}$, so as to obtain a pseudo-source domain image $G_{T \to S}(x_t)$.

In this embodiment, 4098 4-channel GF1B satellite images with a size of 500*500 pixels are transformed from the GF1B domain to the GF1 domain according to the model translation parameter iteration(i,j)=80 and the generator $G_{T \to S}$, so as to obtain pseudo-GF1 domain images $G_{T \to S}(x_t)$.

(7) The pseudo-source domain image $G_{T \to S}(x_t)$ is input to the source domain semantic segmentation model $F_S$ so as to obtain a source domain segmentation probability $P_S$ (a class probability of each pixel point in the image).

(8) The target domain image $x_t$ is input to the pseudo-target domain semantic segmentation model $F_S$ so as to obtain a target domain segmentation probability $P_T$ (a class probability of each pixel point in the image).

(9) The source domain segmentation probability $P_S$ and the target domain segmentation probability $P_T$ are fused to obtain a final segmentation probability P and a segmentation result map. A specific fusion mode is as follows:

$$P = \frac{\lambda_T}{\lambda_S + \lambda_T} \times P_S + \frac{\lambda_S}{\lambda_S + \lambda_T} \times P_T$$

$$map = softmax(P)$$

wherein $\lambda_S$ and $\lambda_T$ are respectively weights of the source domain segmentation probability $P_S$ and the target domain segmentation probability $P_T$. A specific calculation method is as follows:

$$\lambda_S = \frac{F_S(G_{T \to S}(x_s)) \cap Y_S}{F_S(G_{T \to S}(x_s)) \cup Y_S}$$

$$\lambda_T = \frac{F_T(G_{S \to T}(x_s)) \cap Y_S}{F_T(G_{S \to T}(x_s)) \cup Y_S}$$

wherein $G_{T \to S}(x_s)$ is a pseudo-source domain image obtained by inputting $x_s$ to the image generator $G_{T \to S}$ for translation, $F_S(G_{T \to S}(x_s))$ is an output result obtained by inputting $G_{T \to S}(x_s)$ to the model $F_S$, and $F_T(G_{S \to T}(x_s))$ is an output result obtained by inputting $G_{S \to T}(x_s)$ to the model $F_T$.

Table 2 shows results obtained by related experimental tests in terms of before adaptation, histogram matching (a traditional method), fusion of results $P_T$ and $P_S$ in an intersection or union manner, and a fusion strategy in the present invention, and indexes precision, recall and IoU obtained by calculating truth-values of labels.

TABLE 2

|  | Before adaptation | Histogram matching | $P_T$ | $P_S$ | $P_T \cap P_S$ | $P_T \cup P_S$ | map |
| --- | --- | --- | --- | --- | --- | --- | --- |
| precision | 0.7478 | 0.4331 | 0.5856 | 0.5335 | 0.3946 | 0.7244 | 0.5837 |
| recall | 0.166 | 0.7190 | 0.7137 | 0.3114 | 0.7580 | 0.3599 | 0.7191 |
| IoU | 0.1572 | 0.3704 | 0.4742 | 0.2448 | 0.3505 | 0.3165 | 0.4753 |

It can be seen from the above experimental results that compared with that before migration, the index IoU of semantic segmentation is effectively improved by 0.3181 in this embodiment. Meanwhile, compared with that in simple histogram matching, the index IoU in this embodiment is also improved by 0.1049, which shows the necessity of the image translation models. In addition, when one result is significantly worse than another result, an IoU result of $P_T$ will be reduced by just simply fusing $P_T$ and $P_S$ in an intersection or union manner, and on the contrary, this embodiment can improve the IoU result of $P_T$ in this case. Therefore, the present invention is of great help in improving the performance and robustness of semantic segmentation of cross-satellite remote sensing images.

The above description of the embodiments is convenient for those of ordinary skill in the art to understand and apply the present invention. It will be apparent to those skilled in the art that various modifications can be readily made to the above embodiments, and the general principles described herein can be applied to other embodiments without creative efforts. Therefore, the present invention is not limited to the above embodiments, and the improvements and modifications made by those skilled in the art to the present invention according to the disclosure of the present invention should all fall within the scope of protection of the present invention.

The invention claimed is:

1. A semantic segmentation method for cross-satellite remote sensing images based on unsupervised bidirectional domain adaptation and fusion, the method comprising the following steps:
   (1) training, by using a source domain image $x_s$ and a source domain label $y_s$, a source domain semantic segmentation model $F_S$;

(2) training, by using the source domain image $x_s$ and a target domain image $x_t$, bidirectional source-target domain image generators comprising a source-to-target image generator and a target-to-source image generator;

(3) selecting a pair of well-trained image generators from all intermediate image generators saved in the above training process as the source-to-target image generator $G_{S \to T}$ and the target-to-source image generator $G_{T \to S}$;

(4) transforming, by using the image generator $G_{S \to T}$, the source domain image $x_s$ from a source domain to a target domain, so as to obtain a pseudo-target domain image $G_{S \to T}(x_s)$;

(5) training, by using the pseudo-target domain image $G_{S \to T}(x_s)$ and the source domain label $y_s$, a pseudo-target domain semantic segmentation model $F_T$;

(6) transforming, by using the image generator $G_{T \to S}$, the target domain image $x_t$ from the target domain to the source domain, so as to obtain a pseudo-source domain image $G_{T \to S}(x_t)$;

(7) inputting the pseudo-source domain image $G_{T \to S}(x_t)$ to the source domain semantic segmentation model $F_S$, so as to obtain a source domain segmentation probability $P_S$ of the target domain image $x_t$;

(8) inputting the target domain image $x_t$ to the pseudo-target domain semantic segmentation model $F_T$, so as to obtain a target domain segmentation probability $P_S$ of the target domain image $x_t$; and (9) fusing the source domain segmentation probability $P_S$ and the target domain segmentation probability $P_T$ to obtain a final segmentation probability $P$ and a segmentation result map of the target domain image $x_t$.

2. The semantic segmentation method for cross-satellite remote sensing images according to claim 1, wherein in the step (2), a semantic consistency loss function $\mathcal{L}$ is used in the process of training the bidirectional source-target domain image generators, and has an expression as follows:

$$\mathcal{L} = \mathbb{E}\{\partial(F_S(x_S) \| F_T(G_{S \to T}(x_s)))\} + \mathbb{E}\{\partial(F_T(x_t) \| F_S(G_{T \to S}(x_t)))\}$$

wherein $\mathbb{E}\{\ \}$ denotes a mathematical expectation function, $F_S(x_s)$ is an output result obtained by inputting $x_s$ to the model $F_S$, $F_T(G_{S \to T}(x_s))$ is an output result obtained by inputting $G_{S \to T}(x_s)$ to the model $F_T$, $F_T(x_t)$ is an output result obtained by inputting $x_t$ to the model $F_T$, $F_S(G_{T \to S}(x_t))$ is an output result obtained by inputting $G_{T \to S}(x_t)$ to the model $F_S$, $\partial(F_S(x_s)\|F_T(G_{S \to T}(x_s)))$ is the similarity between $F_S(x_s)$ and $F_T(G_{S \to T}(x_s))$, and $\partial(F_T(x_t)\|F_S(G_{T \to S}(x_s)))$ is the similarity between $F_T(x_t)$ and $F_S(G_{T \to S}(x_t))$.

3. The semantic segmentation method for cross-satellite remote sensing images according to claim 1, wherein a specific implementation mode of the step (3) is as follows:

3.1: first, setting the total number of epochs in the training process to be M, saving current model parameters once every $N_i$ epochs, and correspondingly obtaining $$\frac{M}{N_i}$$

image generators $G_{S \to T}{}^i$, wherein $G_{S \to T}{}^i$ denotes the source-to-target image generator saved in the i-th epoch; and similarly, saving the current model parameters once every $N_j$ epochs, and correspondingly obtaining $$\frac{M}{N_j}$$

image generators $G_{T \to S}{}^j$, wherein $G_{T \to S}{}^j$ denotes the target-to-source image generator saved in the j-th iteration, both i and j are natural numbers with $$i \in \left[1, \frac{M}{N_i}\right] \text{ and } j \in \left[1, \frac{M}{N_j}\right],$$

and $N_i$ and $N_j$ are self-set positive integers;

3.2: respectively inputting the source domain image $x_s$ to the image generators $G_{S \to T}{}^i$ and $G_{T \to S}{}^j$, so as to obtain corresponding output results $G_{S \to T}{}^i(x_s)$ and $G_{T \to S}{}^j(x_s)$;

3.3: inputting $G_{S \to T}{}^i(x_s)$ and $G_{T \to S}{}^j(x_s)$ to the model $F_S$ so as to obtain corresponding output results $F_S(G_{S \to T}{}^i(x_s))$ and $F_S(G_{T \to S}{}^j(x_s))$;

3.4: calculating scores iteration-score(i) and iteration-score(j) corresponding to the image generators $G_{S \to T}{}^i$ and $G_{T \to S}{}^j$ according to $F_S(G_{S \to T}{}^i(x_s))$ and $F_S(G_{T \to S}{}^j(x_s))$; and 3.5: taking a set of image generators $G_{S \to T}{}^i$ with the highest corresponding scores iteration-score(i) as $G_{S \to T}$, and taking a set of image generators $G_{T \to S}{}^j$ with the highest corresponding scores iteration-score(j) as $G_{T \to S}$.

4. The semantic segmentation method for a cross-satellite remote sensing image according to claim 3, wherein in the step 3.4, the scores iteration-score(i) and iteration-score(j) corresponding to the image generators $G_{S \to T}{}^i$ and $G_{T \to S}{}^j$ are calculated by the following formulas:

$$\text{iteration-score}(i) = \frac{F_S(G_{S \to T}^i(x_s)) \cap y_S}{F_S(G_{S \to T}^i(x_s)) \cup y_S}$$

$$\text{iteration-score}(j) = \frac{F_S(G_{S \to T}^j(x_s)) \cap y_S}{F_S(G_{S \to T}^j(x_s)) \cup y_S}$$

wherein $y_s$ is the source domain label.

5. The semantic segmentation method for a cross-satellite remote sensing image according to claim 1, wherein in the step (9), the source domain segmentation probability $P_S$ and the target domain segmentation probability $P_T$ are fused to obtain the final segmentation probability $P$ and the segmentation result map of the target domain image $x_t$ by the following formulas:

$$P = \frac{\lambda_T}{\lambda_S + \lambda_T} \times P_S + \frac{\lambda_S}{\lambda_S + \lambda_T} \times P_T$$

$$\text{map} = \sigma(P)$$

wherein $\lambda_S$ and $\lambda_T$ are respectively weights of the source domain segmentation probability and the target domain segmentation probability, and $\sigma(\ )$ is a mapping function from the segmentation probability to the segmentation result.

6. The semantic segmentation method for a cross-satellite remote sensing image according to claim 5, wherein calculation expressions of the weights $\lambda_S$ and $\lambda_T$ are as follows:

$$\lambda_S = \frac{F_S(G_{T \to S}(x_s)) \cap y_S}{F_S(G_{T \to S}(x_s)) \cup y_S}$$

$$\lambda_T = \frac{F_T(G_{S \to T}(x_s)) \cap y_S}{F_T(G_{S \to T}(x_s)) \cup y_S}$$

wherein $G_{T \to S}(x_s)$ is a pseudo-source domain image obtained by inputting $x_s$ to the image generator $G_{T \to S}$ for translation, $F_S(G_{T \to S}(x_s))$ is an output result obtained by inputting $G_{T \to S}(x_s)$ to the model $F_S$, and $F_T(G_{S \to T}(x_s))$ is an output result obtained by inputting $G_{S \to T}(x_s)$ to the model $F_T$.

7. The semantic segmentation method for a cross-satellite remote sensing image according to claim 1, wherein this method is a complete semantic segmentation framework for the cross-satellite remote sensing image, and comprises training of the bidirectional source-target domain image generators, selection of the bidirectional image generators, bidirectional translation of the source-target domain images, training of the source-target domain semantic segmentation models, and generation and fusion of the source-target domain segmentation probabilities.

* * * * *